March 1, 1938.   M. G. BENJAMIN   2,109,939
FEEDING MECHANISM
Filed April 6, 1932   7 Sheets-Sheet 2
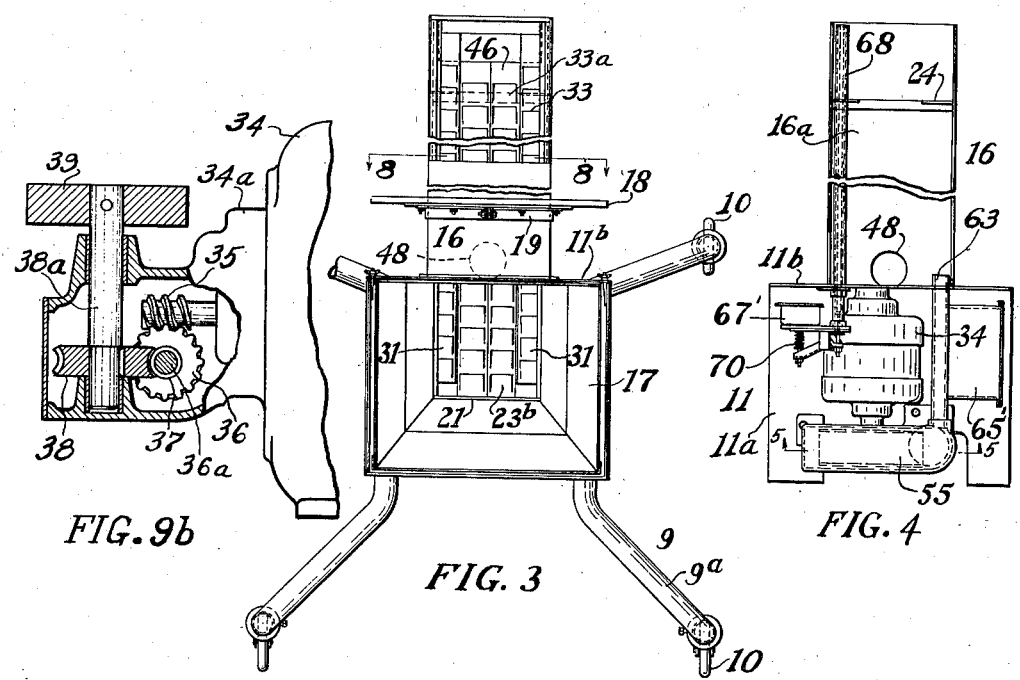
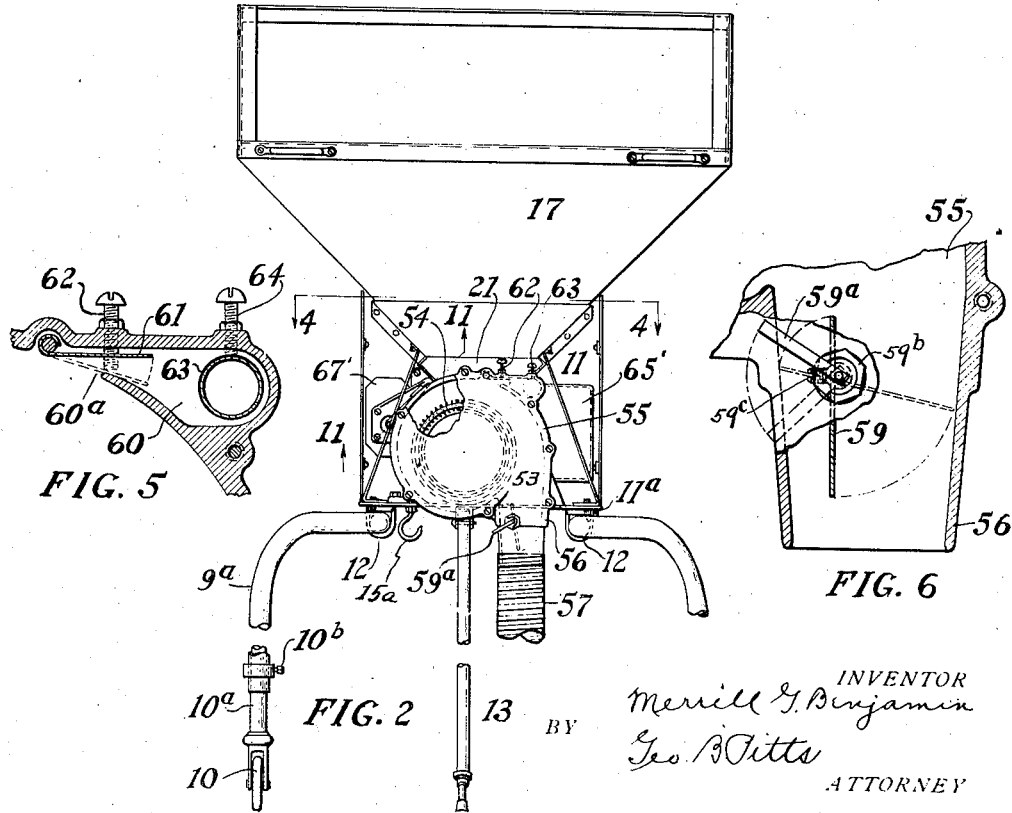
INVENTOR
Merrill G. Benjamin
BY Geo. B. Pitts
ATTORNEY March 1, 1938.  M. G. BENJAMIN  2,109,939
FEEDING MECHANISM
Filed April 6, 1932  7 Sheets-Sheet 3
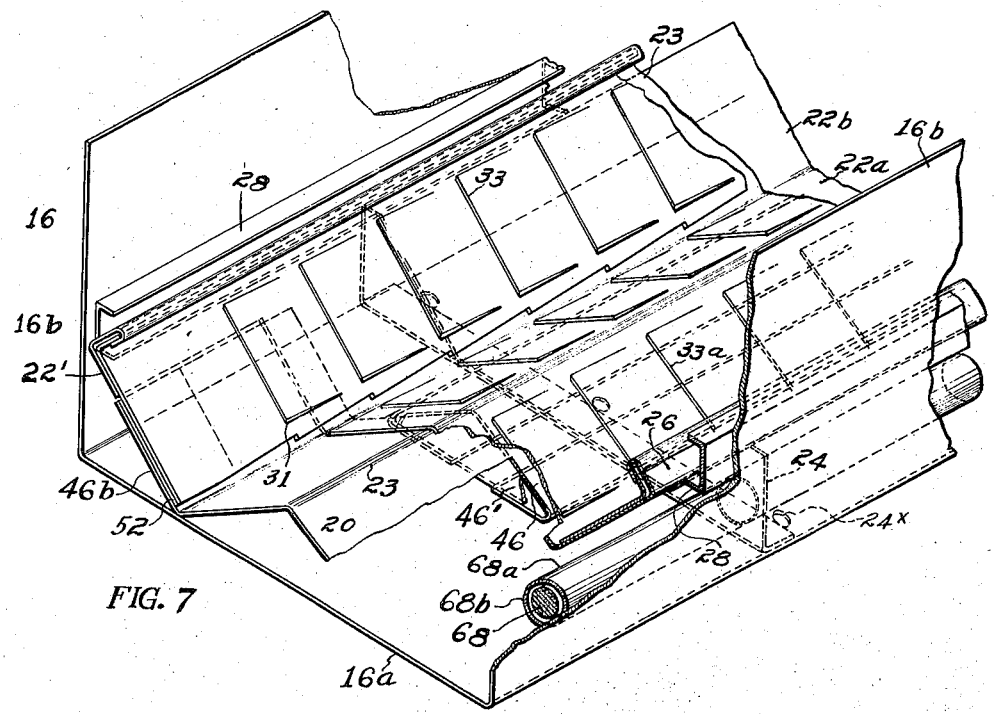
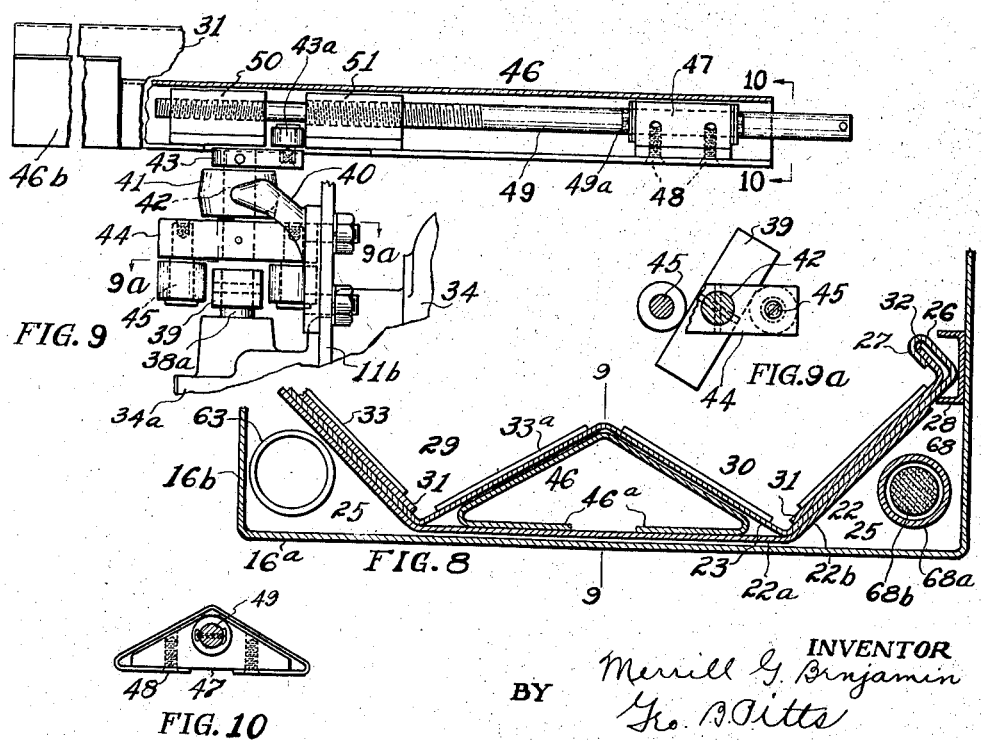
INVENTOR
Merrill G. Benjamin
BY
Geo. B. Pitts
ATTORNEY

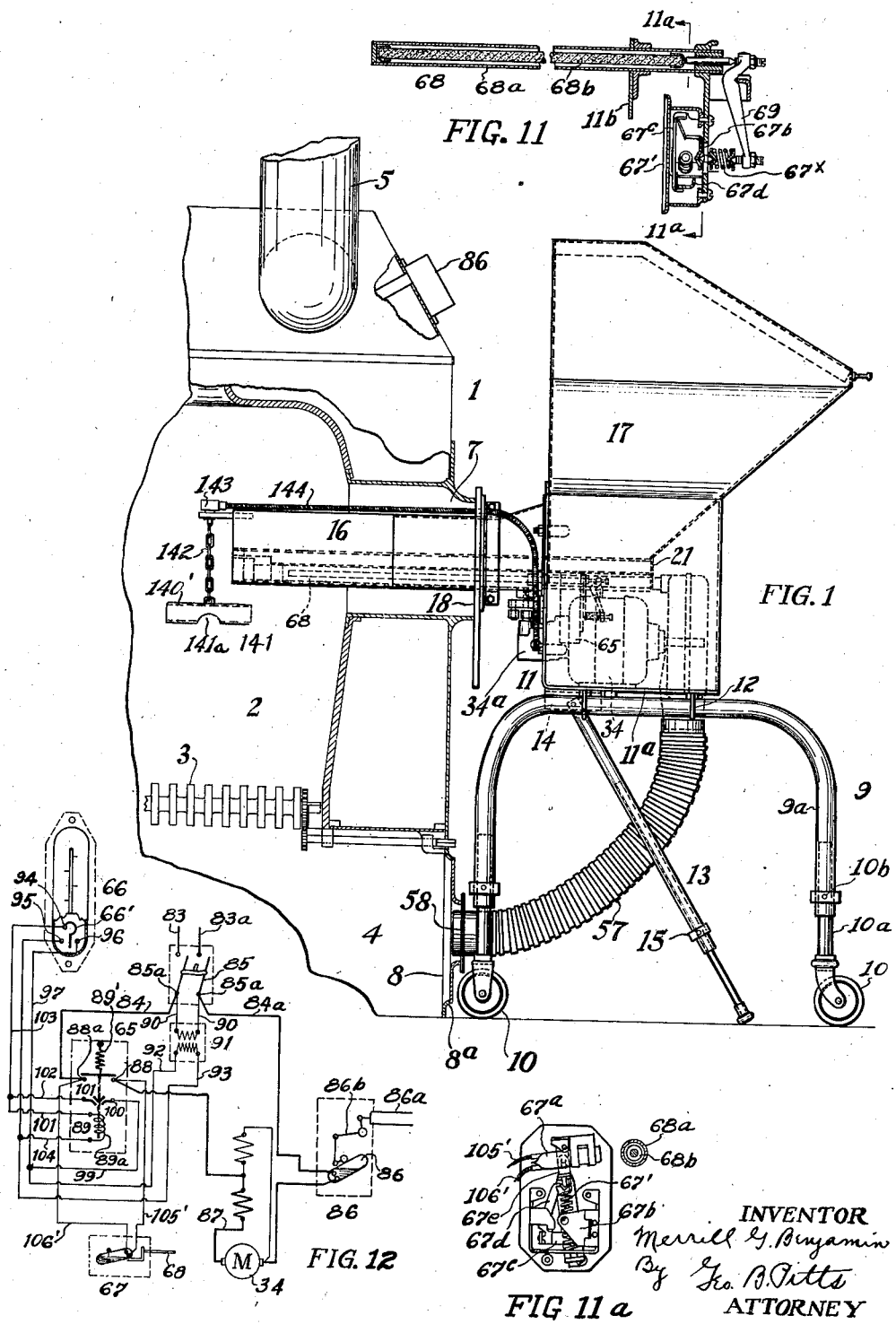

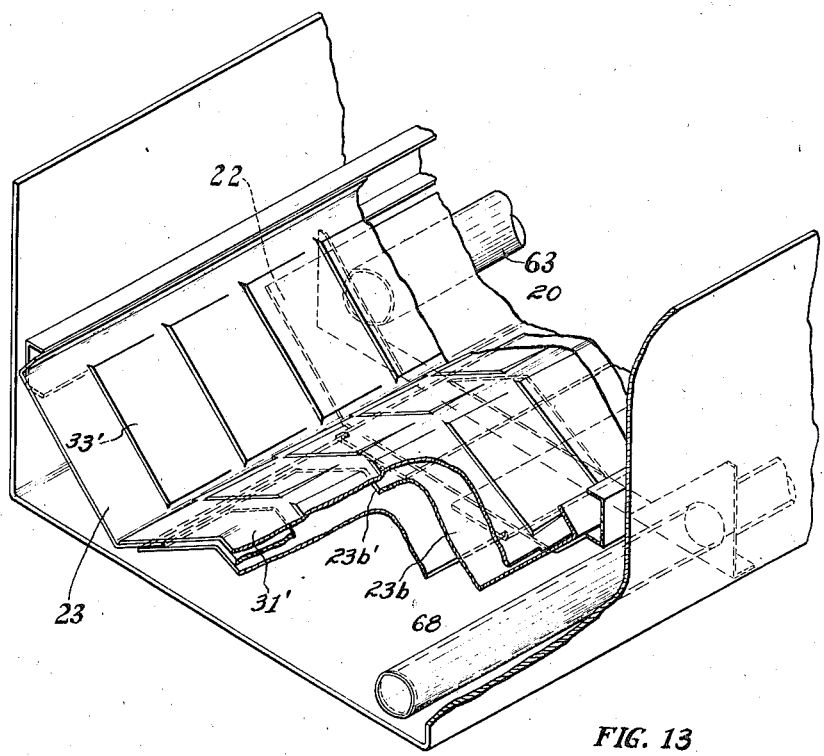
FIG. 13
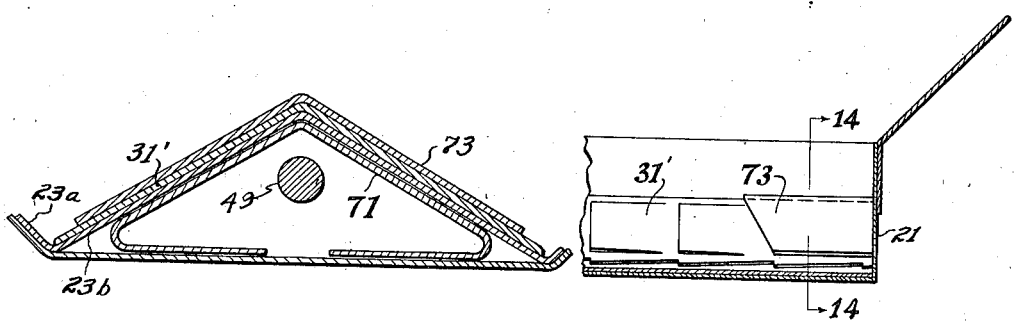
FIG. 14
FIG. 13a

March 1, 1938.  M. G. BENJAMIN  2,109,939
FEEDING MECHANISM
Filed April 6, 1932   7 Sheets-Sheet 5

INVENTOR
Merrill G. Benjamin
BY
Geo. B Pitts
ATTORNEY

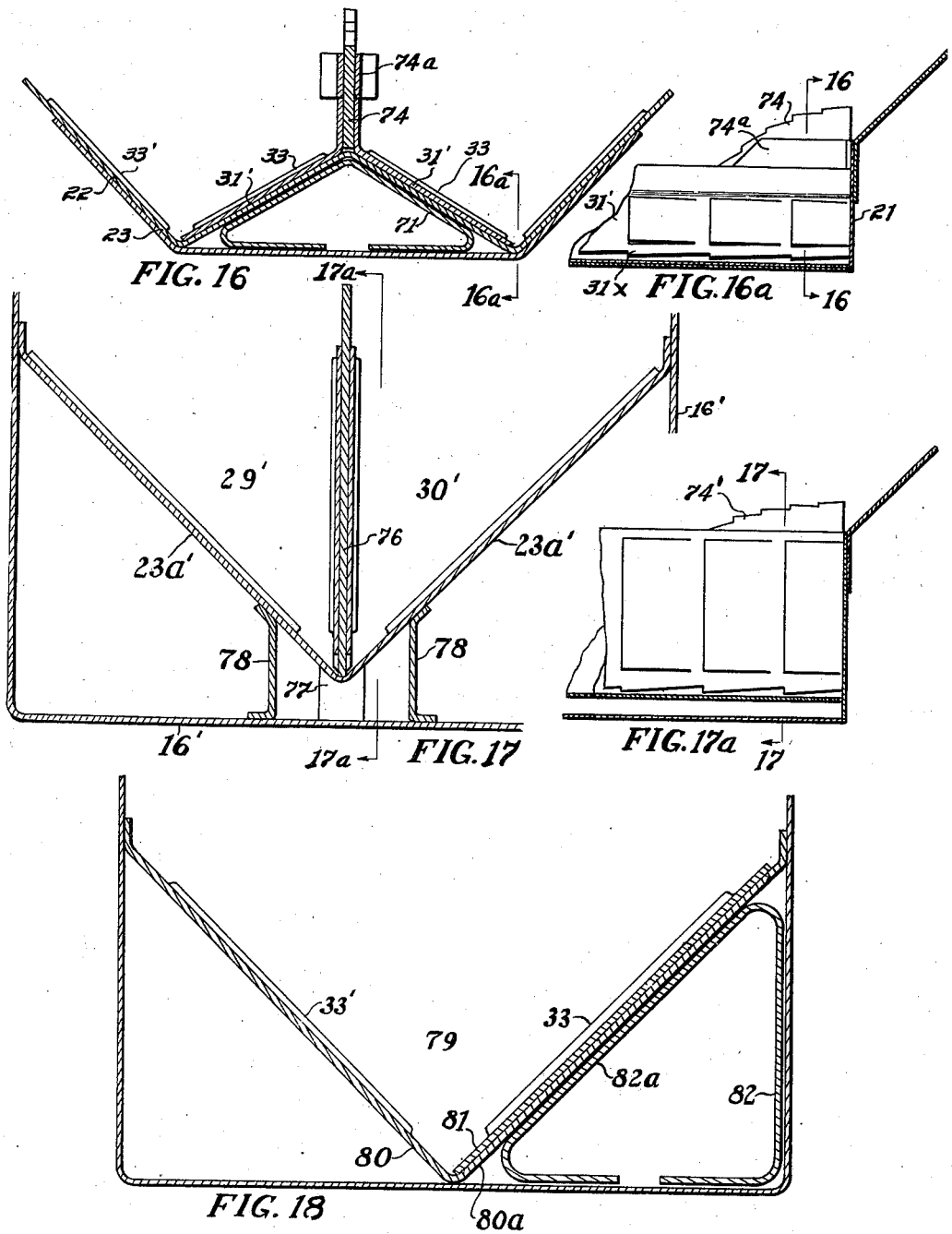

March 1, 1938.                    M. G. BENJAMIN                    2,109,939
                                 FEEDING MECHANISM
                              Filed April 6, 1932            7 Sheets-Sheet 7
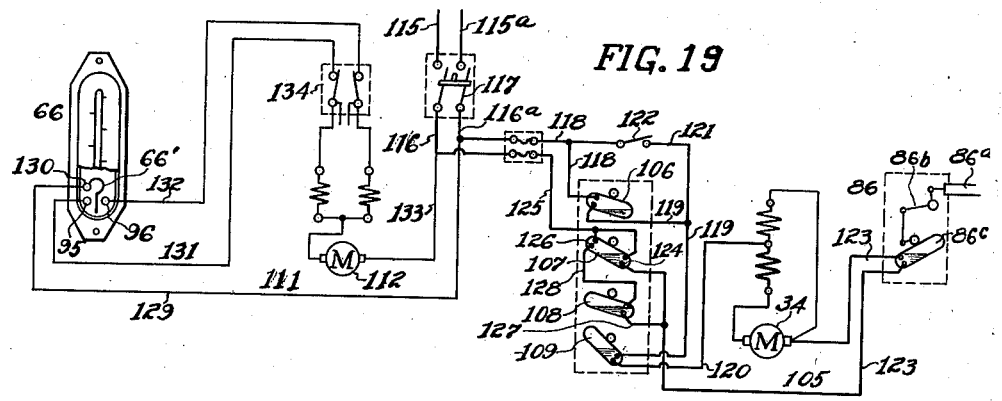
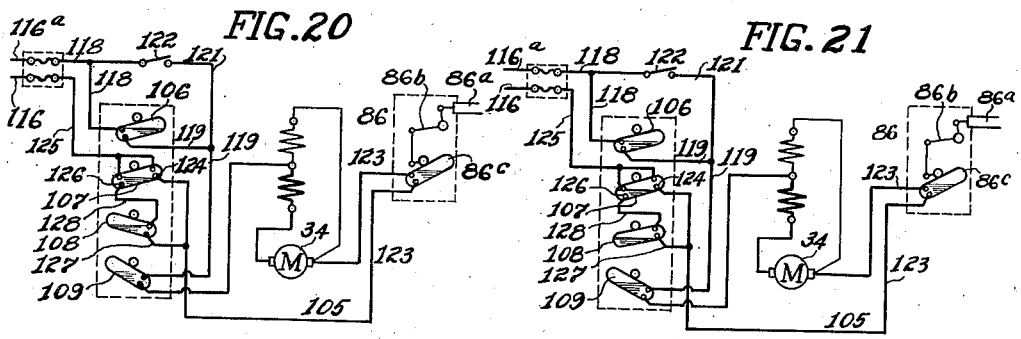
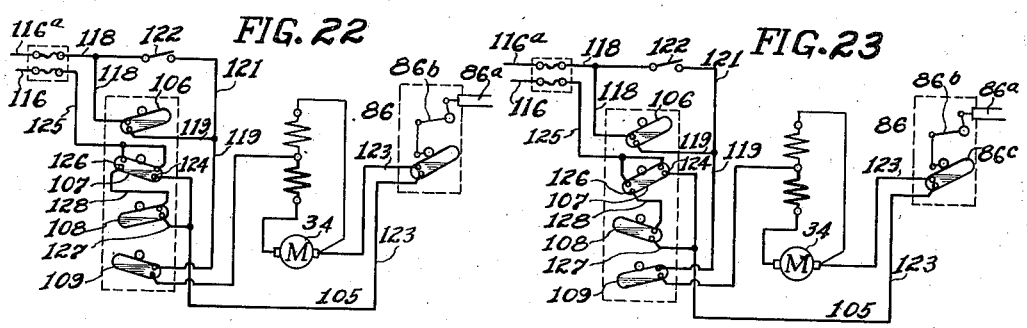
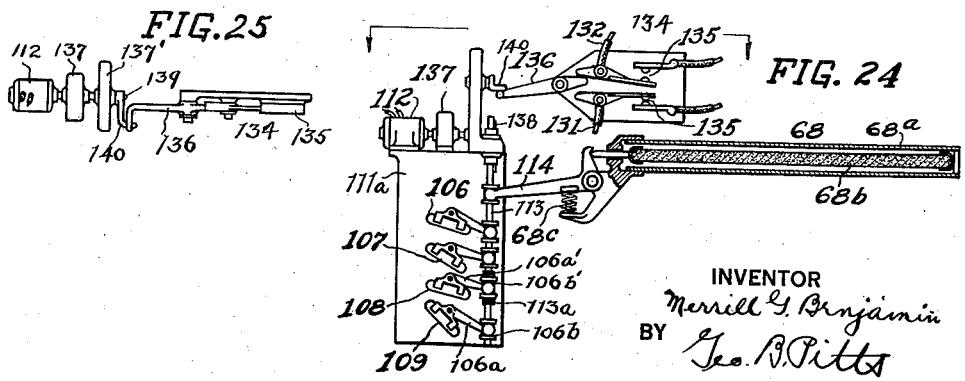
INVENTOR
Merrill G. Benjamin
BY Geo. B. Pitts
ATTORNEY Patented Mar. 1, 1938

2,109,939

UNITED STATES PATENT OFFICE 2,109,939

FEEDING MECHANISM

Merrill G. Benjamin, Lakewood, Ohio, assignor to Minneapolis-Honeywell Regulator Company, Minneapolis, Minn., a corporation of Delaware Application April 6, 1932, Serial No. 603,653

18 Claims. (Cl. 236—15)

This invention relates to an apparatus for feeding material into a receiver, chamber or the like at a desired predetermined rate, whereby it may be used for (a) mixing materials in or fed to such receiver in desired proportions or (b) maintaining therein a substantially predetermined supply of the material where such material is being removed or discharged from the receiver or consumed therein. The invention also relates to a system for controlling the operation of a heating apparatus.

In the illustrated application of the invention, the receiver constitutes the fire box of a furnace or other heating apparatus and the material to be fed or delivered thereto comprises solid combustible fuel, for example, coal or coke (or a mixture thereof) in powdered or other forms (buckwheat, barley, nut or larger sizes), as desired; and in such application of the invention, it includes a system which is capable of (a) controlling and maintaining adequate combustion under varying load conditions and at a substantially predetermined temperature in the area to be heated when therein is required, and (b) cutting out the power means for the feed when abnormal conditions exist, namely, rise of temperature in the fire box above a predetermined degree, heating of the heat transfer medium above a predetermined temperature or pressure or extinguishment of the fire in the fire box.

One object of the invention is to provide an improved apparatus of this character capable of efficiently and automatically varying the rate of combustion of a fire bed in the fire box of a heating apparatus to compensate for changing conditions affecting the temperature in the area or areas to be heated, whereby such area or areas are maintained at substantially any desired temperature.

Another object of the invention is to provide an improved mechanism for feeding fuel to a fire bed at a rate substantially equal to the rate of combustion therein, whereby resulting gases are consumed or burned in the fire box and heat losses are avoided.

Another object of the invention is to provide an improved fuel feeding mechanism adaptable to man fired heating apparatus and capable of so placing the fuel in the fire box that maximum area of contact between the fire bed and heat absorbing surfaces of the fire box is obtained.

Another object of the invention is to provide a fuel feeding mechanism and to combine therewith an improved means for distributing the fuel to or upon the fire bed and for causing turbulence of the gases and air in the fire box, whereby oxygen is mixed with the gases and burned therewith and stratification of air and combustion gases in the fire box is prevented.

Another object of the invention is to provide an improved system or method of controlling combustion in the fire box of a heat producing unit or apparatus, whereby the maximum uniformity of combustion chamber conditions is maintained consistent with load conditions imposed on the apparatus and over travel or hunting of the system is eliminated.

Another object of the invention is to provide an improved fire bed fuel supply and control mechanism in which the fire is maintained in (a) active burning condition in accordance with changes in outside temperature conditions to insure a substantially uniform or fixed temperature in the area or areas to be heated and (b) a substantially inactive burning condition, when the temperature in the areas to be heated rises above a predetermined degree and so long as it remains thereabove, whereby a pilot fire results to insure active combustion when heat is required and fresh fuel is delivered to the fire bed.

Another object of the invention is to provide an improved apparatus of this character in which the feed of the material to a fire box may be effected substantially uniformly and in small quantities.

Another object of the invention is to provide an improved fuel feeding mechanism and to combine therewith control mechanisms which automatically maintain active combustion or a relatively low fire in the fire bed of a fire box to serve as a pilot, when active combustion is not required and automatically cuts out the power means for the feeding mechanism when abnormal conditions in the fire box exist.

Another object of the invention is to provide for a mechanism for feeding fuel to a fire box, a plurality of inter-related controls for said mechanism, certain thereof being actuated by the external temperature conditions and others thereof being actuated by the temperature existing in the fire box where abnormal conditions therein develop.

Another object of the invention is to provide an improved feeding mechanism having related devices which insure substantially uniform feeding of the material without danger of the material caking or clogging or affecting the operation of the mechanism.

Another object of the invention is to provide an improved mechanism for feeding fuel from a hopper to a combustion chamber, such mechanism including a feed channel one wall of which reciprocates relative to another wall of the channel and serves to feed the fuel forwardly and to partially support the fuel while being fed, whereby uniformity of feed and discharge of the fuel into the combustion chamber results.

Another object of the invention is to provide an improved feeding mechanism that is relatively simple in construction, economical to manufacture and easy to assemble and also economical to operate and readily controlled.

Another object of the invention is to provide a unitary mechanism for feeding fuel and supplying air to a fire box of a heating apparatus below the fuel bed, whereby a sufficient draft is insured and adequate combustion maintained to effect efficient consumption of the fuel under varying temperature conditions.

A further object of the invention is to provide a portable, unitary fuel feeding and air supply mechanism readily adaptable to varying types of furnaces and other heating apparatus without alteration of the latter.

A still further object of the invention is to provide a fuel stoking mechanism having feed devices extending into the fire box of a heating apparatus and means for supplying air to the walls of said feed devices to prevent over-heating thereof without affecting fuel combustion in the box.

Other objects of the invention will be apparent to those skilled in the art to which my invention relates from the following description taken in connection with the accompanying drawings, wherein Fig. 1 is a fragmentary view of a heating apparatus (partly in section) and a side elevation of a mechanism embodying my invention associated therewith in position to feed fuel into the fire box of such apparatus.

Fig. 2 is a front elevation of the mechanism, parts being broken away.

Fig. 3 is a plan view (certain detail parts being omitted).

Fig. 4 is a section on the line 4—4 of Fig. 2, with the feeding devices omitted.

Figs. 5 and 6 are fragmentary sectional views showing details of construction, taken on the line 5—5 of Fig. 4.

Fig. 7 is a fragmentary perspective view of the delivery end of the feed trough and feed devices, parts thereof being broken away to facilitate the illustration.

Fig. 8 is a section (enlarged) on the line 8—8 of Fig. 3.

Fig. 9 is a fragmentary section on the line 9—9 of Fig. 8.

Fig. 9a is a section on the line 9a—9a of Fig. 9.

Fig. 9b is a fragmentary view with parts broken away.

Fig. 10 is a section on the line 10—10 of Fig. 9.

Fig. 11 is a fragmentary section on the line 11—11 of Fig. 2.

Fig. 12 is a diagram of the circuits for one form of control means for the feed motor.

Fig. 13 is a view similar to Fig. 7, but showing a modified form of construction.

Fig. 13a is a fragmentary view of the inner end of the feed devices of the form shown in Fig. 13.

Fig. 14 is a section on the line 14—14 of Fig. 13a (enlarged).

Fig. 16 is a section showing a different form of feeding devices, being a section on the line 16—16 of Fig. 16a.

Fig. 16a is a side view of parts shown in Fig. 16.

Fig. 17 is a section showing another form of feeding devices, being a section on the line 17—17 of Fig. 17a.

Fig. 17a is a side view of parts shown in Fig. 17.

Fig. 18 is a section showing still another form of feeding devices.

Fig. 19 is a diagram showing a modified form control means and the circuits therefor.

Figs. 20, 21, 22 and 23 are fragmentary views of the circuits for the feed motor, but showing the positions the control switches occupy under varying temperature conditions to control the operation of the motor.

Fig. 24 is a view, partly diagrammatic, showing the connections between the fire box thermostat and the room thermostat controlled motor and the circuit controlling switches.

Fig. 25 is a plan view of certain portions of Fig. 24.

Figure 15:
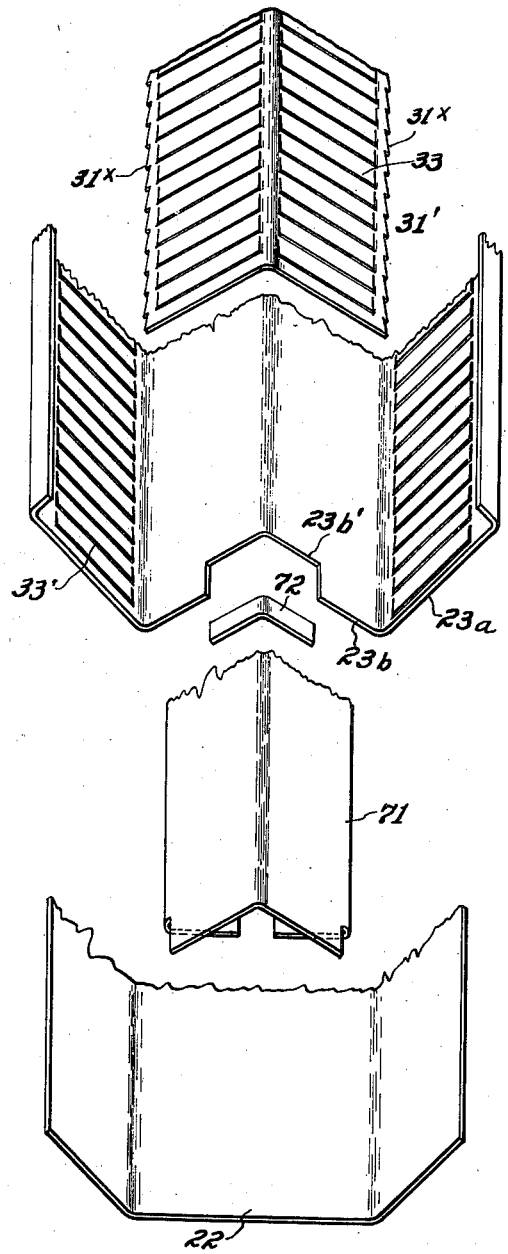
Fig. 15 is a perspective view of certain of the parts shown in Fig. 13, but in separated relation.

In the drawings, 1 indicates as an entirety a heating apparatus which may comprise a hot water or steam boiler, but which is illustrated, by way of example, in the form of a warm air furnace having a fire box 2, a grate 3, ash pit 4 and air drum from which flues 5 (only one being shown) lead to the areas (such as the rooms of a building) to be heated; the fire box 2 having a feed opening 7 and the ash pit 4 having an opening 8.

9 indicates as an entirety a support mounted on suitable rollers 10, which may be of the caster type. The support 9 preferably consists of a pair of inverted U-shaped members 9a formed of tubing, the open ends of which receive the shanks 10a of the mountings for the rollers 10. The shank for each roller mounting may be adjusted vertically in the adjacent tube and fixed in adjusted position by a set screw 10b. The legs of the U-members are bent laterally as shown in Fig. 3 to stabilize the mechanism. 11 indicates an angle plate, the horizontal portion 11a of which is rigidly secured to the U-members, as by clips 12, such portion serving to hold the U-members in rigid, spaced relation. 13 indicates a locking device adapted to hold the support and the mechanism carried thereby in operative relation to the heating apparatus 1, as shown in Fig. 1, the rollers 10 permitting the support to be readily rolled into and out of position and the locking device 13 serving to prevent it from moving away from the heating apparatus 1 due to any unevenness in the floor A or otherwise. Such locking device 13 is in the form of a prop, which eliminates the necessity of connecting the support to the heating apparatus 1.

The prop 13 comprises a member pivotally connected at its upper end to a U-clip 14 on the bottom 11a of the angle plate 11 and adapted to engage the floor A at its opposite end, as shown in Fig. 1. This member consists of two elements, preferably adapted to telescope, one within the other, whereby the member may be lengthened or shortened to suit varying conditions, the elements being fixed in adjusted relation by a set screw 15. The prop may be held in an inoperative position by a clip 15a.

16 indicates a spout connected at its inner end to the vertical portion 11b of the angle plate 11 and extending forwardly therefrom for projection through the fire box opening 7 into the fire box 2, as shown in Fig. 1. The spout is formed of high heat resisting sheet metal. At its inner end the spout 16 is provided with flanges by which it is rigidly bolted or otherwise secured to the plate 11b. The spout forms an enclosed conduit for the fuel from a hopper 17 to the space inwardly of the opening 7 within the furnace 1 and a support for the fuel feeding devices to which reference will later be made. The inner end of the spout registers with an opening formed in the wall 11b through which the fuel is fed from the hopper 17. The spout 16 is preferably rectangular in cross section and comprises a bottom 16a, sides 16b and a top, but the latter preferably terminates inwardly of the outer or free end of the bottom and side walls forming the spout (see Fig. 3). The bottom, sides and top of the spout 16 form a support for an adjustable closure and shield 18, which is adapted to engage the walls of the opening 7 and close the space between these walls and the walls of the spout. In this connection it will be noted that when my mechanism is positioned (see Fig. 1), the door for the opening 7 is removed and the support 9 is positioned with the shield in engagement with the walls of the opening 7, so that it becomes a door, with the spout 16 extending therethrough, to close the opening. The closure 18 comprises a relatively thick asbestos board and extends downwardly below the opening to shield the operating mechanism and other parts from heat radiating from the furnace walls. The shield is provided on its outer face with a plurality of angle strips 19 which slidably engage the walls of the spout so as to permit adjustment of the shield inwardly and outwardly, relative to the outer or delivery end of the spout. The strips 19 may be adjustably fixed to the spout in any desired manner.

When so fixed, the delivery end of the spout will be in the desired relation to the center of the fire box 2 when the support 9 is moved into position with the shield 18 against the walls of the opening 7.

20 indicates a trough extending from a point near the delivery or outer end of the spout therethrough and the opening in the plate 11b to the hopper 17, the trough being connected with the discharge opening of the latter and closed at its inner end by a wall 21 (Figs. 1, 2 and 3). The trough comprises a bottom plate 22 having a horizontal section 22a disposed in spaced relation to the bottom 16a and upwardly inclined sides 22b, and an upper plate 23, preferably of W-shape in cross section, the lateral sides of which are parallel to and spot-welded to the sides 22b. The inner end of the plate 22 is connected to the wall 21 and its outer end is connected to a transverse upstanding wall 24 having a flange on which the plate section 22a rests, said flange being suitably secured to the bottom 16a of the spout 16; whereas the plate 23 extends from the wall 21 outwardly beyond the wall 24 (see Fig. 7), for a purpose later set forth, but the lateral edge portions of the plate 23 are extended, as shown at 22' to provide extended guides hereinafter referred to. The transverse plate 24 is cut away throughout its central portion, corresponding to the cross section of the plate 22. The plate 24 serves to close the space between the plates 22, 23, and adjacent walls 16a, 16b, of the spout 16, to prevent in-flow of heat and gases into the spout and out-flow of air therefrom. The lateral longitudinal edges of the plate 23 are bent inwardly, as shown at 26, at substantially right angles to the upwardly and outwardly inclined sides 23a and the free edges of the bent portions 26 are bent back thereon, as shown at 27, to form closed guides, for a purpose later set forth. 28 indicates channels secured to the side walls 16b and forming supports for the end portions of the sides 23a.

By forming the plate 23 into W-shape, it will be seen that I provide two parallel feeding channels 29, 30, for the fuel or material, leading from the hopper 17 substantially to the discharge end of the spout, each having inclined sides, and each closed along its bottom and connected together to form a closed space between their inner or adjoining sides, which space is utilized for the power operated elements to effect feed for the fuel, as will later appear. Each feed channel is thus formed of two walls which co-operate to support the fuel as it is fed from the hopper to the point of discharge. One side of each channel 29, 30, forms a guideway and support for a reciprocatable member, preferably extending from the wall 21 to the end of the spout 16, less the maximum travel of said member, whereby the fuel is progressively fed forwardly uniformly for discharge from the outer end of the spout 16. By mounting the reciprocating device on one wall of the channel, it partially supports the fuel during feed thereof. In the form of construction shown in Figs. 1, 3, 4, 7 and 8, the reciprocatable members (shown at 31) are mounted on the outer sides 23a of the channels 29, 30, and each comprises a sheet metal strip having a width substantially equal to the width of the side 23a, and provided along its outer longitudinal edge with a flange 32 which slides in the guideway formed between the adjacent walls 26, 27. Each member 31 is provided with material advancing elements 33 and the adjacent side 23b of the channel is provided with material retarding elements 33a. Each element 33, 33a, preferably comprises a transverse, up-standing rib, formed by offsetting the metal to form an active transverse face at substantially right angles to the surface of the metal, the rearward portion of the off-set metal section being inclined inwardly and merging with the surface of the metal, so that the fuel is fed forwardly on the stationary device by the elements 33 on the reciprocatable device without appreciable obstruction, but is held against rearward or retrograde movement during inward movement of the reciprocatable device by the elements 33a. In this arrangement of relatively movable sides for each channel, uniform supply of the fuel in small quantities to the fire bed is insured in the operation of the reciprocatable members 31, the effect of which is to provide an even and uniform active combustion in the fire bed of the furnace, in accordance with the operations of the mechanisms controlling such feeding mechanism (as later set forth), so that the resulting combustion consumes in the fire box substantially all of the resulting gases. Furthermore, in the arrangement described, the feeding members 31 co-act with the opposed walls 23b to keep the material concentrated in the channels while feeding it forwardly, so that feeding elements disposed centrally of the channels and movable with respect to their walls are eliminated. In other words, instead of providing in the central portions of the channels feeding devices which, in pushing the material forwardly, would tend to spread it over the sides of the channels, I reciprocate one side of the channel, the effect of which is to carry the fuel on one side and to roll or drag it along the other, stationary side, so that there is a tendency for the material to gravitate in the channel while being moved forwardly. In the preferred arrangement shown, each channel comprises a stationary inclined side and a reciprocatable inclined side, so that the fuel is supported substantially equally on both these sides and accordingly there is a positive engagement between the reciprocatable feed member and the fuel. As these sides extend continuously from end to end of the spout, the same movement is simultaneously imparted to all portions of the fuel between the hopper and discharge end of the spout. By reason of this arrangement and operation, the feed of the fuel is progressive from end to end of the spout and danger of portions of the fuel accumulating into piles or masses and being pushed laterally over the sides of the channels or discharged as such into the fire box is substantially eliminated; also, a more even control of the fire bed is insured and accumulation of unburned gases is prevented, irrespective of the rate of speed of the feeding members. As each flange 32 slidably fits into the guide-way and the latter is closed by the wall 27, fuel dust and fuel particles cannot lodge in between the feeding member 31 and side 23a and affect its operation.

The means for reciprocating the members 31 comprise the following:

34 indicates an electric motor suitably fixed to the plate 11a. One end of the shaft for the motor 34 extends into a casing 34a (see Fig. 9b) and is provided with a worm 35 which is in mesh with a worm 36 on a horizontal shaft 36a, said shaft being suitably supported in the casing 34a. The shaft 36a is provided with a worm 37 which meshes with a worm gear 38 on a vertical shaft 38a, also suitably supported in the casing 34a, and carrying a crank 39, preferably comprising a cross member extending radially to either side of the shaft. The shaft 36a, in the preferred form of construction also drives a flexible shaft, as hereinafter set forth. 40 indicates a bracket fixed to the wall 11b (see Fig. 9) and supporting a bearing 41 for a shaft 42, disposed substantially axially of the shaft 38a. The shaft 42 carries on its upper end a crank 43 and on its lower end a cross member 44 extending radially of the shaft to opposite sides thereof, these parts being pinned to the shaft and preventing endwise movement thereof in its bearing 41. The outer ends of the member 44 carry depending pins 45 disposed in the path of movement of the crank 39 and are engaged by the opposite end portions of the latter to rotate the shaft 42, these parts thereby serving as a flexible connection between the shafts 38a and 42. By preference, the pins 45 are provided with rollers to reduce friction between them and the crank 39 and such rollers may be formed of rubber or provided with rubber peripheries to eliminate noise. 46 indicates a hollow bar, formed of sheet metal and preferably triangular in cross section, slidably fitting within the space between the sides 23b of the plate 23 and bottom section 22a of the plate 22, the outer end of the bar 46 being connected to the reciprocatable members 31, as later set forth. 47 indicates a block fitting within the bar 46 near its inner end and fixed thereto by a plurality of countersunk screws 48 (see Figs. 9 and 10). The block 47 is formed with a through opening for a rod 49, which is free to rotate in the opening but is fixed to the block against relative endwise movement by washers engaging its opposite ends and held by cotter pins 49a or other suitable devices. The inner end of the rod 49 is threaded through a pair of spaced nuts 50, 51, disposed upon opposite sides of the crank 43 and arranged to be engaged by the latter as it revolves to effect reciprocation of the rod 49 and through it, reciprocation of the bar 46. The threads on the rod 49 are right and left hand, so that by rotating the rod, the nuts 50, 51, may be adjusted toward or from each other, the effect of which is to increase or decrease the throw of the rod, in each revolution of the crank 43, within certain limits. The nuts 50, 51, are shaped to loosely slide within the bar 46, but are held against rotation by the walls thereof. The crank 43 is preferably provided with a hardened steel roller 43a to engage the nuts 50, 51, to reduce friction. The bottom wall 16a of the spout 16 is formed with an opening 48' (see Figs. 3 and 4) and the bottom walls of the bar 46 are cut away (see Fig. 9) to accommodate the crank 43.

To connect the bar 46 to the reciprocatable members 31, I slit the bottom walls 46a of the bar transversely at a point remote from their outer ends and bend the resulting sections 46b outwardly and upwardly into parallel relation with the outer end portions of the members 31 and position between such related parts spacers 52, to which the parts are spot-welded. As the spacers 52 are slightly thicker than the adjacent sides 23a, the sections 46b move in a plane outwardly of the walls 23a. By preference, the walls 46a are slit at such point rearwardly of the free end of the walls 23a that the sections 46b overlap these latter walls throughout the travel of the feed members 31 (as shown in Fig. 7) to prevent fuel from gravitating into the spout 16 rearwardly of the sections 46b. Also, by forming the bar 46 of triangular shape, its top walls 46b' and the outer end portions of the members 31 form continuations of the channels 29, 30, as the bar and members move outwardly and inwardly, to convey the material to the discharge end of the spout where it gravitates to the fuel bed. The bar 46 is closed by a plate 46' disposed rearwardly of the sections 46b (see Fig. 7). This wall 46' and the wall 34 serve to prevent circulation or escape of heat and gases inwardly through the spout 16.

53 indicates as an entirety means for supplying air under pressure to the ash pit 4 below the grate 2, and into the spout 16 rearward of the wall 24, such supply being in proportion to the speed of the motor 34 and feed of the material or fuel into the fire box. The supply means comprises a blower 54, preferably of the multi-blade type, suitably mounted in a casing 55, the shaft of the blower being connected to an extended end of the shaft of the motor 34, so that air is supplied only when the motor 34 is in operation. The casing 55 is provided with a main outlet 56 to which is connected one end of a flexible conduit 57, the opposite end thereof leading into and through a draft opening formed in the door 8a for the opening 8; the latter end of the conduit being provided with a plate 58 to close the draft opening around the conduit. The plate 58 may be detachably connected to the ash pit door 8a.

The outlet 56 is provided with a valve 59, suitably trunnioned on an off-set axis to rock, so that the pressure of the supplied air maintains it open when the blower is operating, but when the blower is stopped, a counterweight 59 closes the valve to prevent escape of gases from the ash pit, or flow of air thereinto by reason of any suction effect within the fire box.

The supply of air through the conduit 56 may be regulated by the following means: that end of the rock shaft for the valve 59 adjacent the counterbalance 59a rotates in a tubular member 59b, which is threaded into a hollow boss provided on the wall of the conduit. The member 59b is provided on its outer end with a collar, the outer sides of which are flat to form tool engaging surfaces. At one side the collar is cut away to receive the arm constituting the counterbalance 59a, and one end wall of the cut away forms a stop, which is engaged by the arm 59a to limit the swing of the valve 59 to the open position; accordingly, by rotating the tubular member 59b in its supporting boss, the stop may be positioned to regulate or limit the swing of the valve 59. The tubular member 59b is held in its adjusted position by a set screw 59c.

The casing 55 is also provided with a lateral chamber 60 connected with the casing 55 by an opening or port 60a, which is normally closed by a gravity operating valve 61 and opened by the pressure of the air when the blower is set in operation. The movement of the valve 61 is regulated by a set screw 62, to control the supply of air to the chamber 60. The inner side wall of the chamber 60 is formed with an opening into which the inner end of a pipe 63 fits, such pipe being held in position therein by a set screw 64. The pipe 63 extends outwardly, through the wall 11b and into the adjacent space 25 (see Fig. 4) between the walls of the spout and side walls 22a. The outer end of the pipe 63 is open and supplies air into the spout 16 to maintain its walls and those of the trough relatively cool and for another reason to be later set forth. Such supplied air may escape through openings 24x formed in the spout wall 16a to the fire box for combustion purposes.

Figs. 13, 13a, 14 and 15 show a modified form of construction in which the reciprocatable feed members and stationary sides of the channels are reversed; that is, the walls 23a of the W-member 23 (which is mounted within the plate 22 as shown in Fig. 7) are provided with retarding elements 33' and the feed member having feed elements 33, for each channel slides on the adjacent wall 23b. In this arrangement the feed members, shown at 31', are integrally connected and straddle the walls 23b; also the central portion of the walls 23b at their outer ends are cut away, as shown at 23b' so that the outer end of the triangular bar 71 (which is similar to the bar 46 and operated by the motor 34 through the driving elements already referred to) may be connected through a spacer or plate 72 to the feed member 31', such cut-away affording a space for the plate 72 to move in; also, the side walls 23a may be extended to the outer end of the spout 16. The bar 71, plate 72 and members 31' are preferably spot-welded together. In this form of construction I provide a hood 73 for the rear or inner end of the feed members 31', the hood being secured to the wall 21 and overlying the feed members to prevent dust and particles of fuel lodging below or behind them.

The opposite longitudinal side edges of the members 31' are preferably provided with propelling elements 31x formed by cutting the edges inwardly to leave laterally projecting faces, the purpose of which is to feed forwardly dust and small particles of the fuel and prevent it accumulating in the bottom of the channel.

Figs. 16 and 16a show a construction similar to Figs. 13, 13a, 14 and 15, but in which the reciprocatable feed members 31' carry at their rear or inner ends and centrally between them an agitator 74 adapted to engage the fuel in the bottom of the hopper and prevent it from clogging on the one hand and on the other hand provide a more even gravitation of the fuel into the feed channels. The agitator 74 is guided between a pair of strips 74a having flanges spot-welded to the wall 21.

Figs. 17 and 17a show a construction in which the feed members are disposed adjacent to each other, as shown in Figs. 13 to 16a, inclusive, but are disposed vertically and secured (as by spot-welding) to the opposite faces of a reciprocatable plate 76, which, near the outer end of the spout 16' is connected to a block 77, operated similarly to the bar 46. The rear end portion of the plate 76 is provided with an agitator 74', similar to the agitator shown in Figs. 16 and 16a. In this form of construction, the outer sides of the feed channels 29', 30', are supported by the side walls of the spout 16' and plates 78 resting on the bottom thereof.

Fig. 18 shows a construction in which a single feed channel 79 is provided in the spout. In this construction, one inclined side 80 is provided with retarding elements 33' and the opposite or opposed inclined side 80a carries a reciprocatable feed member 81 provided with fuel advancing elements 33. Also, in this form of construction the operating bar, shown at 82 is mounted to reciprocate in the space below the wall 80a and is connected to the member 81, by providing a spacer between its inclined wall 82a and the member 81 and spot-welding these parts together, the wall 81 being cut away to receive the spacer and permitting it to reciprocate. The bar 82 is reciprocated similarly to the bar 46.

Combustion in the fire box may be maintained for an indefinite period of time due to the supply of fuel and air by the feeding or stoking mechanism, but preferably the combustion and supply of heat and air is automatically controlled. In one arrangement, shown in Fig. 12, I provide (a) a suitable control responsive to temperature changes in the area or areas to be heated, as such areas are affected by outside temperatures, whereby the feeding or stoking mechanism is operated and stopped in accordance with such temperature changes to maintain a substantially fixed temperature in such areas and (b) a suitable control responsive to the conditions within the fire box (when outside temperature permits), whereby the feeding or stoking mechanism is operated and stopped in accordance with such fire box temperature changes to maintain a substantially inactive fire bed which serves as a pilot.

In another arrangement, shown in Figs. 19 to 25, inclusive, I provide an operating system for the heating apparatus controlled by a thermostat located in the combustion chamber and responsive to the temperature therein, and including a room thermostat and a mechanism controlled thereby for regulating or adjusting the responsive action of the combustion chamber thermostat, whereby—as later set forth—the system controls the combustion or heat supply automatically and stops the fuel feed and air supply when abnormal conditions exist.

Referring to one form of control means diagrammatically shown in Fig. 12, the motor 34 is set in operation and stopped by switch means 65 under control of a thermostat 66, which is located in the area to be heated. The thermostat is adjustable to effect closing of a circuit of the switch means at any predetermined degree, it preferably having an adjustment range from 50 to 90 degrees F. The thermostat 66 and its adjustment means may be of any desired construction, but is arranged to close a circuit upon the drop in temperature to that for which it is set and to break the circuit upon the rise of temperature approximately one degree. When the temperature in the area remains above that degree for which the thermostat 66 is set to effect closing of the motor circuit the feed mechanism remains idle and permits the fire in the fire bed to gradually die down or drop, with a corresponding drop in temperature of the gases or atmosphere in the fire chamber. To prevent extinguishment of the fire on the one hand and on the other hand, to maintain sufficient combustion in the fire bed to ignite fresh fuel in the event the thermostat 66, due to drop in the room temperature, operates the switch means 65, I provide for the automatic starting and stopping of the motor 34 to feed fuel to the fire box by a supplemental switch 67 (see Figs. 11, 11a) under the control of a thermostat 68, which extends through the other space 25 in the spout 16 and beyond the wall 24, so that its outer end is exposed to the radiant heat in the fire box. The thermostat 68 preferably comprises an outer tube 68a of copper (which has a relatively high coefficient of expansion) and an inner member, for example a rod 68b form of carbon (which has a relatively low co-efficient of expansion). The inner end of the tube 68a is fixedly mounted in the wall 11b and is closed at its outer end. The rod 68b normally bears against the closed outer end of the tube 68a and moves inwardly under the influence of a spring (later referred to) with such end when the tube expands, but is moved outwardly by such end when the tube contracts. At its inner end, the rod 68b is arranged to actuate a lever 69, which in turn closes the switch 67 (as later set forth), these parts being so arranged that the switch 67 will close the circuit when the temperature in the fire box falls to or below approximately 150° F. and open the circuit when the temperature in the fire box rises to or above approximately 175°, that is, so long as the temperature in the fire box is above 150°, the tube 68a is pressed inwardly under the influence of its spring, but if the combustion in the fire bed drops so that the temperature in the fire box falls to or below approximately 150° F., then the tube 68a will contract sufficiently to cause endwise movement of the rod 68b, the effect of which is to close the switch 67 and set the motor 34 in operation, whereby fresh fuel and air will be supplied to the fire bed to maintain combustion therein. Upon rise in temperature of the atmosphere in the fire box to or above 175°, the thermostat 68 will open the motor circuit and effect stoppage of the motor. The switch 67 and thermostat 68 are inter-related to the switch means 65 and thermostat 66 for controlling it and so arranged and connected in the circuit for the motor 34 that the switch 67 automatically operates when the thermostat 66 is inoperative and is ineffective when the temperature conditions are such as to bring the thermostat 66 into operation.

The switch mechanism 65 is mounted in a casing 65' and the switch 67 is mounted in a casing 67' (see Figs. 2, 11 and 11a).

The thermostats 66 and 68 control the circuits for the motor 34 in the following manner: the supply mains are indicated at 83, 83a, and are connected by a double arm knife switch 85 through terminals 85a to leads 84, 84a. The lead 84a has interposed in it a safety switch 86, to which reference will later be made, and extends to one side of the motor 34. From the other side of the motor is a lead 87 connected to one contact (88) of an electro-magnetic switch 89, the other contact 88a of the switch being connected to the lead 84, so that when the switch 89 is closed by energization of the switch coil 89a (against the tension of a spring 89'), the circuit for the motor 34 is closed across the contacts 88, 88a. The coil 89a is energized and de-energized by the control of the following circuits by the thermostat 66.

90, 90, indicate leads connecting the terminals 85a with terminals of the primary winding of a transformer 91. The secondary winding of the transformer is connected to leads 92, 93. The thermostat 66 preferably comprises a bi-metal element 66' connected at its inner end to a main terminal 94. The free end of the thermo-element 66' is adapted, (a) when the surrounding temperature is above that at which the adjustment member thereof is set, to engage a terminal 95 which is connected to the lead 93 and (b) when the temperature falls below the predetermined set degree, to engage a terminal 96, which is connected to the lead 92.

99 is a lead connected to the lead 92 and the terminal 100 of a second switch 101 opened and closed by the magnetic switch 89 simultaneously with the opening and closing respectively of the circuit across the terminals 88, 88a, the other terminal of the switch 101 being connected by a lead 102 to a lead 103 which in turn is connected to the main terminal 94. The lead 103 is connected by lead 101' to one end of the winding 89a, the other end of the latter being connected by a lead 104 to the lead 93.

The switch 67 preferably comprises a mercoid tube 67a, the contacts of which are connected by leads 105', 106', to the contacts 88, 88a, respectively, and serves to complete the circuit for the motor 34 and set it in operation when and upon the drop of the temperature below that for which the thermostat 68 is set, as already set forth, with resulting feeding of the fuel to the combustion chamber or fire box.

The switch means 65 and switch 67 operate as follows: Assuming that the main switch 85 is closed, the thermostat 66 is set to operate when the temperature in the room where it is located drops to 68° F. and that such temperature is higher. Under these conditions, the thermo-element 66' will be in contact with contact 95. If the temperature drops to 68° F. the thermo-element 66' will swing into engagement with the terminal 96. This engagement completes a circuit through lead 92 to one side of the secondary winding of the transformer 91 and from the other side of the latter through lead 93, lead 104, winding 89a, lead 101' and lead 103 to the terminal 94. Such circuit will energize the coil 89a and effect closing of the motor circuit across terminals 88, 88a, thus setting the motor 34 in operation and also closing of the circuit across the switch 101. Accordingly, if the thermo-element 66' disengages the terminal 96 (due to rise in temperature) the circuit for the coil 89a will remain completed as follows: From one end of the secondary winding 91 through lead 92, lead 99, switch 101, lead 102, lead 103, load 101', coil 89a, lead 104 and lead 93 to the other end of the secondary winding. If the temperature continues to rise, then the thermo-element 66' will engage terminal 95 and effect a short circuiting of the coil 89a, the effect of which is to de-energize the latter; whereupon the motor circuit across terminals 88, 88a, will be broken, thus, stopping the motor 34 and the supplemental circuit through switch 101 will be opened, so that the circuits cannot again be completed until the thermo-element 66' again engages the terminal 96.

The mercoid tube 67a is mounted in a cradle 67e, connected through multi-levers 67b, 67c, 67d, to the main lever 69, one lever (67d) being normally actuated in one direction by a spring 67' and operating through the levers and lever 69 to move thermo-element 68b inwardly when the thermo-element 68a expands. 67x is a spring interposed between the levers 69 and 67b (see Fig. 11) and arranged to compensate for over travel of the thermo-element 68b outwardly and inwardly beyond the limits of movement of the lever 67b.

Figs. 19 to 25, inclusive, illustrate diagrammatically a system of control wherein (a) a substantially uniform temperature is maintained in the combustion chamber in accordance with the load conditions imposed on the system by means of a thermostat within the fire box or combustion chamber, which thermostat has an operative range from a minimum temperature condition capable of maintaining relatively low ignition of the fuel to a high temperature condition slightly below the point where damage might result to the stoking mechanism or heating apparatus and (b) the fuel feeding mechanism is stopped when the temperature in the fire box drops below the minimum ignition temperature condition above referred to, for any reason, for example, loss of ignition of the fuel through exhaustion of the fuel supply; such system also includes means controlled by a thermostat, actuated by the temperature in the area or room to be heated, for adjusting or regulating the action of the fire box thermostat, whereby the latter will maintain the combustion chamber at that temperature necessary to maintain the desired temperature in the area or room to be heated. The room temperature control means is co-operatively related to the mechanism actuated by the fire box thermostat through a compensating or differential connection therewith, which connection provides an automatic adjustment for the fire box thermostat, whereby the latter becomes responsive to varying temperature conditions in the fire box to control the fuel feeding and air supply mechanism. Such control by the fire box thermostat maintains maximum uniformity of combustion chamber conditions and eliminates over-travel or hunting of the system.

The control means now being described, except the room thermostat and the power means immediately controlled thereby, may be mounted in the casing 67'; and the power means may be mounted on the support 9.

Referring to these views, 105 indicates a circuit for the motor 34 having four control switches 106, 107, 108 and 109 and an emergency or safety switch mechanism 86 already referred to. The operation of the switches 106, 107, 108 and 109 is controlled, as hereinafter set forth, by the thermostat 68, the location and construction of which have already been described, but by means of the compensating connection (above referred to) for the switch 108, this switch is adjustable into varying connected relations to the thermostat 68 by mechanism controlled by the room thermostat 66, whereby the thermostat 68 will maintain maximum uniformity of combustion chamber conditions consistent with the heat required from time to time in the area to be heated and over-travel or hunting of the system will be eliminated. 111 indicates a supplemental circuit for a motor 112, the operation of which adjusts the switch 108, as later set forth, this circuit being completed or broken by the operation of thermostat 66. Each of the switches 106, 107, 108 and 109 preferably consists of a mercury tube, swingably supported in a suitable manner on a plate or base 111a (see Fig. 24), which may form part of the casing 67', and having one pair of contacts, except the tube 107 which has two pairs of contacts, the purpose of which will later appear. 113 indicates a shaft which is moved endwise by mechanism actuated by the thermostat 68 and it is also rotated by mechanism driven by the motor 112 under control of the thermostat 66. Each of the switches 106, 107 and 109 is provided with an arm 106a having a bifurcated end fitting between the flanges of a collar 106b, which is fixed to the shaft so that when the latter is moved endwise, the adjacent switch is swung about its pivot to close or open a circuit as later set forth; whereas the arm 106a' for the switch 108 is pivotally connected to a collar 106b' operated by the endwise movement of the shaft 113, the pivot connection serving to prevent rotation of the collar 106b'. The collar 106b' is threaded internally and engages threads 113a on the shaft 113; and accordingly when the shaft 113 is rotated, the collar 106b' is moved endwise relative to the shaft 113, the effect of which is to swing tube 108 about its pivot according to the direction of rotation of the shaft. Such adjustment of the tube 108 changes its relation to the thermostat 68, so that the latter, in response to the temperature in the fire box, will close and open the motor circuit at different temperature limits, respectively, as compared to the limits before any such adjustment is made. Each operating mechanism for the shaft 113 may, in some instances cause operation of the switch 108 independently of the other mechanism, or both mechanisms may operate simultaneously to swing the switch in the same or opposite directions, dependent upon temperature conditions affecting the thermostats 66 and 68 and the position of the latter at any moment. The shaft 113 is operated in endwise directions through a suitable multi-leverage 114 by the thermostat 68 to simultaneously swing or rock the switches, but the switches 106, 107 and 109 bear different angular relations to each other, so that each is operated in accordance with the extent of thrust movement inwardly or outwardly of the inner thermo-element 68b. The switch 108 is similarly operated, but by means of the adjustment above referred to its position or angular relation varies from time to time for reasons which will later appear. The leverage 114 is shown diagrammatically as a single lever connected to the shaft 113 in the same manner as each of the arms 106a, the lever operating to move the shaft 113 downwardly when the thermo-element 68a contracts and the spring 68c acting through the lever to move the shaft 113 upwardly when the element 68a expands.

The tube (switch) 109 is actuated by the thermostat 68 to open the motor circuit when the temperature in the fire box rises to or above a predetermined degree, for example 1000° F. and to close the circuit when the temperature falls therebelow, irrespective of the temperature of the room in which the thermostat 66 is located. That is, should the temperature in the fire box, due to the combustion of fuel therein, rise to an abnormal degree, for example 1000° F., the thermostat element 68a would expand and permit the element 68b to move inwardly (toward the right in Fig. 24) under the influence of the spring 68c, thereby swinging the tube 109 from the position shown in Figs. 19, 20, 21, 22 and 24 to the position shown in Fig. 23, in which position the circuit for the motor 34 would be broken; and upon the drop of the temperature, for example, to or below 975° F. the tube 109 would be rocked in the opposite direction and close the circuit. The tube (switch) 107 is actuated by the thermostat 68 to close the motor circuit when the temperature in the fire box drops to a predetermined degree, for example, 100° F. and to open the motor circuit upon the rise of the temperature to approximately 125° F., the purpose of this switch by control of the fuel feed mechanism being to maintain the minimum combustion conditions in the fire bed, when such combustion conditions are not controlled by the switch 108. Upon opening of the circuit by the switch 107, the circuit is closed to position the tube 108 operatively in the circuit.

The tube (switch) 108 is actuated by the thermostat 68 to control the operation of the fuel feed mechanism to maintain a substantially uniform temperature in the fire box according to demand for heat in the room; that is, the thermostat 68 operates to move endwise the shaft 113 which in turn rocks the switch 108 to open or close the motor circuit, but due to the adjustable connection between the tube 108 and shaft 113, the thermostat 68 serves to rock the switch 108 and effect opening and closing of the motor circuit in any position of adjustment of the tube 108, so that the action of the thermostat 68 is regulated to control the switch 108 in accordance with the varying loads imposed on the system at all times. For example, if the compensating connection for the switch 108 is set so that the thermostat 68 will operate the switch to circuit closing position at a temperature of 300° F., in the combustion chamber and open the circuit at 325° F., therein and heat is required in the room. thermostat 66 will set in operation the motor 112 which through the shaft 113 will adjust the switch arm 106a' downwardly on the shaft 113, so that thermostat 68 will operate the switch to close the circuit at a temperature of 325° F. in the combustion chamber and open the circuit at 350° F. therein. If heat is still required in the room, thermostat 66 will effect a further adjustment of the switch 108, so that thermostat 68 will be effective to close the circuit at a still higher temperature in the fire box for example, 350° F. and open the circuit at 375° F. These operations will continue until a balance results between the heat supplied and the heat required. When the heat supplied exceeds that required for the room, the thermostat 66 will effect operation of the motor 112 to rotate the shaft 113 in the opposite direction to adjust the switch arm 106a' upwardly, so that the thermostat 68 will rock the switch 108 to circuit closing position and to circuit opening position at respective lower temperatures in the combustion chamber. If the heat supplied still remains above that required in the room, the thermostat 66 will effect a further adjustment upwardly of the switch arm 106a', so that the thermostat 68 will rock the switch to the circuit closing and circuit opening positions only when the temperature in the combustion chamber reaches still lower degrees, respectively, these operations being repeated until a balance results between the heat supplied and the room temperature. The (switch) 106 is actuated by the thermostat 68, irrespective of the room temperature to open the circuit for the motor 34 in the event the temperature in the fire box drops to an abnormal degree, for example, 75° F. if the fire goes out, due to exhaustion of the fuel or for other reasons.

115, 115a, indicate the supply mains connected to leads 116, 116a, through a main switch 117. 118 indicates a lead extending from the lead 116a to one contact of the tube 106, the other contact of the tube being connected by a lead 119 to one contact of the tube 109 and the other contact of the latter tube being connected by a lead 120 to one side of the motor 34. 121 is a lead connecting the leads 118, 119, and having interposed in it a switch 122. The lead 121 upon the closing of the switch 122 completes the motor circuit when the switches 106, 107 and 108 are open, as at the time a fire is started in the fire box 2, but after the fire is started and the circuit is completed through one of the switches just mentioned, the switch 122 is opened. From the other side of the motor 34 is a lead 123 connected to one contact of one pair of contacts 124 for the tube 107, the other contact of the pair (124) being connected by a lead 125 to one contact of the other pair of contacts 126 and to the lead 116; the lead 123 is also connected by a branch lead 127 to one contact for the tube 108. The other contact for the tube 108 is connected by a lead 128 to the other contact 126.

The circuit 111 for the motor 112 consists of the following: 129 is a lead connecting the lead 116a with the terminal 130 to which thermo-element 66' of the thermostat 66 is connected. The free end of the thermo-element 66' is adapted to make contact with terminals 95, 96, connected by leads 131, 132, respectively, through reversely wound field coils for the motor 112 to one side thereof, whereby the motor is driven in one direction or the other accordingly as the thermo-element 66' contacts with one or the other terminal. The other side of the motor 112 is connected by a lead 133 to the lead 116. 134 is a limit switch mechanism having pairs of contacts 135, one pair of which is separated by a rocker 136 to stop the motor 112 after it has operated the switch to its extreme limit in one direction. The motor 112 operates through a suitable gear reduction enclosed in a casing 137 to drive, at relatively low speed, a gear within the gear case 137', which gear drives a pinion (also within the case 137') drivingly connected through a spline 138 to the shaft 113 to rotate it, while permitting the shaft to move endwise.

The gear which is within the casing 137' and driven through the gear reduction by the motor 112 also meshes with another gear (also in the casing 137') to drive a shaft 139, to which is connected a crank 140. The crank 140 is arranged in making one revolution in one direction to engage the rocker 136 (see Fig. 24) and open one pair of contacts to break the circuit for the motor 112. If the crank 140 is revolved one revolution in the opposite direction, it will engage the rocker 136 and open the circuit through the other pair of contacts. It will thus be seen that the pairs of contacts 135 will serve to limit the operation of the motor 112 in either direction and thus limit the adjustment of the switch 108. Also, when one pair of contacts are disengaged, the circuit remains closed through the other pair of contacts upon closing of the circuit to operate the motor in the opposite direction.

*Operation.*—Fig. 19 shows the position of the tubes (switches) 106, 107, 108 and 109 when the fire in the fire box is out and main switch 117 is open. If the temperature of the room was below that at which the thermostat 66 is set to operate, and the main switch was closed, the motor 112 would operate to rock the tube 108 to the position shown in Figs. 19 and 24 and then stop due to operation of the limit switch as shown in this latter view; if the room temperature was above that at which the thermostat 66 is set to operate, the motor 112 would move the switch or tube 108 to its other position; accordingly it will be seen that when the fire is out, the tube 108 may occupy either of its extreme positions, whether the main switch is opened or closed.

Assuming that heat is required, the thermo-element 66' would be in engagement with the terminal 96 and upon the closing of the main switch 117, the motor 112 will rock the tube to the position shown in Figs. 19 and 24. The fire is kindled and the supplemental switch 122 is closed to set the motor 34 in operation, the motor circuit being traced as follows: lead 116a, lead 118, lead 121, lead 119, switch 109 and lead 120 to the motor 34 and from the motor, through lead 123, switch contacts 124 of tube 107, lead 125 and lead 116. As soon as sufficient heat is generated to expand the thermo-element 68a, the switch 106 will close the circuit (see Fig. 20), so that the circuit will be completed through lead 119, switch 106 and lead 118 and switch 122 may be opened. As combustion in the fire box increases, further expansion of the thermo-element 68a will effect rocking of the tube (switch) 107 to the position shown in Fig. 20. The return motor circuit will then traverse lead 127, switch 108, lead 128, switch contacts 126 of tube 107, lead 125 to lead 126, and the motor 34 will continue to operate until the thermostat 68 actuates the tube 108 to the position shown in Fig. 21; the motor circuit will then be broken across the contacts of this tube. If the temperature in the room drops, the thermo-element will engage terminal 96 and operate the motor 112 which in turn will adjust the tube 108 to the position shown in Fig. 20 and the motor 34 will be started. If, however, the room temperature remained above that at which the thermostat 66 was set when additional heat was required, and the temperature in the fire box dropped to 100° F., the thermostat 68 would rock the tube 107 from the position shown in Fig. 21 to that shown in Fig. 22 and thus close the motor circuit; the return motor circuit would then traverse lead 123, contacts 124 of the tube 108, lead 125 and lead 116. Accordingly, it will be seen that the tube 107, through the pair of contacts 124, open and close the motor circuit when the thermostat 66 is inactive and the tube 108 is in open-circuit position, to maintain the minimum ignition condition in the fire box (see Figs. 21 and 22) and that the pair of contacts 126 of tube 107 position tube 108 in operative relation to the motor circuit when the temperature in the fire box is at or above that at which the circuit through the contacts 124 is open. The thermostat 66' makes contact with the terminals 95 to drive the motor 112 in one direction and with terminal 96 to drive the motor in the opposite direction. If the element 66' makes contact with one of these terminals and then disengages therefrom, the motor circuit is broken, so that the motor 112 is operated to adjust switch 108 only so long as thermo-element 66' is in contact with one of these terminals.

From the foregoing description it will be seen that the combustion chamber thermostat controls the operating switch 108 according to substantially predetermined conditions in the chamber dependent upon the adjustment of the switch 108 and that when the demand for heat or the load imposed on the apparatus increases or decreases, the room thermostat causes the adjustment of the switch 108, the effect of which is to re-establish or re-set the conditions to be maintained by the combustion chamber thermostat in the combustion chamber. The room thermostat therefore will cause gradual increased or decreased increments in the temperature to be maintained in the heating apparatus in accordance with the increments in the load, upwardly or downwardly, imposed on the apparatus.

The safety switch 86 comprises a thermostat 86a disposed so as to be affected by the heating medium, namely, air in the present disclosure, a leverage 86b and a mercoid tube 86c the contacts of which are interposed in the lead from one side of the motor 34 (lead 84a in Fig. 12 and lead 123 in Fig. 19).

As shown, the tube 86b is normally maintained in that position which closes the circuit, but should the heating medium in the heating apparatus rise to an abnormal degree, the thermostat 86a will swing the tube to its other position and thus break the motor circuit. Where the heating apparatus consists of a steam boiler the switch 86 would be of pressure type and operate to open the circuit for motor 34 at a predetermined pressure below the safe operating pressure of the boiler.

141 indicates as an entirety means related to the outer end of the spout 16 and in the path of the fuel as it is discharged therefrom for distributing it over the grate or fire bed instead of allowing it to pile up in the form of a cone, the purpose being to maintain a fire bed in contact with the heat absorbing surfaces or walls of the fire box. The means 141 may be disposed below the spout, but suspended therefrom, and arranged to divert the falling fuel toward opposite sides of the fire box. In the preferred form of construction, I provide a device, supported centrally between its ends and provide means for rotating it, so that the fuel is engaged and impelled downwardly and outwardly in various directions, whereby a substantially uniform distribution of the fuel around the fire box results; also, I provide a device so constructed that the atmosphere in the fire box is stirred or mixed to insure turbulence and burning of the gases and the prevention of stratification. To effectively carry out these functions, the device comprises a section of piping 140' open from end to end and formed on its lower side with an opening 141a. The pipe section is pivoted centrally to the lower end of a flexible element, such as a chain 142. The upper end of the chain is connected to a gear in a gear box 143 and the gear meshes with a worm on the outer end of a flexible shaft 144. The inner end of the flexible shaft 144 is suitably geared to one end of the shaft 36a. The fuel in falling or discharging from the spout 16 is engaged by the rotating pipe section and diverted in lateral directions so that the fuel bed is built up in contact with the side walls of the fire box and more or less distributed over the entire area of the box. The rotating pipe section serves also to induce a flow of the gases and oxygen in the fire box through the opening 141 and these gases and oxygen are discharged from the ends of the pipe section. As a result, a circulation of the atmosphere is effected and the gases resulting from combustion become mixed with any free oxygen, so that the gases are readily consumed in the fire box.

It will be noted that the thermostat 68 extends through the wall 24, so that the portion beyond the wall is exposed to the heat of the combustion chamber and the portion inwardly of the wall is exposed to the air supplied through pipe 63. The position of the wall 24 may be changed to expose a larger or smaller portion of the thermostat to the radiant heat from the combustion chamber; also, by adjustment of the valve 61 the amount of air delivered into the spout 16 may be regulated to vary the responsive action of the thermostat 68, whereby its range of operation, that is, the difference in temperatures between the closing and opening of the switch 108, may be varied.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In a heating system, the combination with a heating apparatus having a combustion chamber, of a spout extending into said chamber, means for feeding fuel through said spout, thermostatic controlled mechanisms for starting and stopping said feeding means, one of said mechanisms being controlled by the rise and fall of the temperature in the area to be heated by said apparatus and the other mechanism being controlled by the rise and fall of the temperature in said combustion chamber, the thermostat for the last mentioned mechanism being disposed in said spout whereby said last mentioned mechanism may be assembled with said heating apparatus as a unitary structure.

2. In a control mechanism for a heating apparatus having a power operated stoker or fuel feeding mechanism, the combination of a room thermostat, a switch for starting and stopping said mechanism, controlled by said thermostat, a plurality of separate switches, arranged to start and stop said mechanism, and a thermo-actuated device affected by temperature changes in the fire box of the heating apparatus and operatively connected to all of said switches for operating either one thereof dependent upon predetermined temperatures in the fire box, one of said separate switches being arranged to stop said mechanism in the event the fire in the fire box becomes substantially extinguished.

3. In a control mechanism for a heating apparatus having a power operated fuel feeding mechanism, of a switch for starting and stopping the feeding mechanism, a thermostat affected by changes in temperature in the fire box of the heating apparatus, operating mechanism between said thermostat and said switch for operating the latter, a thermostat in the space to be heated, and means controlled by the last mentioned thermostat for adjusting the said switch relative to said operating mechanism.

4. In mechanism of the class described, the combination with a heating apparatus having a fire box and a mechanism for feeding fuel to said box, said mechanism including an electric motor, of a circuit for said motor, a thermostat in said fire box, a switch in said circuit arranged to open and close said circuit, an adjustable connection between said switch and said thermostat, a thermostat affected by changes in temperature in the room to be heated, and means controlled by the last mentioned thermostat for adjusting said connection.

5. In mechanism of the class described, the combination with a heating apparatus having a fire box and a mechanism for feeding fuel to said box, said mechanism including an electric motor, of a circuit for said motor, a plurality of switches in said circuit, a thermostat within said heating apparatus and connected to said separate switches for operating them, respectively, dependent upon substantially predetermined temperatures in said apparatus, and means controlled by the temperature external to the fire box for adjusting the connection between said thermostat and one of said switches.

6. In apparatus of the class described, the combination with a heating apparatus having a combustion chamber and power means, including an electric motor, for feeding fuel thereto, of a circuit for said motor, a thermostat within said chamber, a plurality of switches in said circuit connected to and actuated by said thermostat, one switch arranged to close the circuit when the temperature in said chamber drops to a predetermined limit, another switch arranged to open said circuit when the temperature in said chamber rises to a predetermined limit, another switch arranged to operate between said limits, and means responsive to the demand for heat on said apparatus for adjusting the connection between the last mentioned switch and said thermostat.

7. The combination with a furnace, of an auxiliary machine and means for driving it, regulator means having a thermostat within said furnace for controlling said auxiliary machine to maintain substantially constant combustion conditions therein, a second regulator external to said furnace responding to the demand on the furnace, and means actuated by said second regulator to adjust said regulator means to maintain some other substantially constant conditions in accordance with the demand on the furnace.

8. A control system for a heat producing unit having interrelated control elements, one of which is in the space utilizing the heat produced, and another is located in the combustion chamber of the heat producing unit and arranged that when the temperature in the combustion chamber is above or below predetermined limits the system is inoperative, a control device arranged to operate the heat producing unit at a constant low rate and another control device arranged to be operative between the low rate, the latter control device actuated by the first mentioned control element.

9. In a temperature control system having a furnace for heating a space, the combination of fuel supplying means for the furnace, means responsive to space temperatures for controlling said fuel supplying means, means responsive to furnace temperatures for controlling also said fuel supplying means, and means responsive to furnace temperatures for rendering both of said temperature responsive means inoperative when the furnace temperature decreases to a predetermined low value or increases to a predetermined high value.

10. In a temperature control system for a furnace for supplying heating fluid to a space for heating the same, the combination of fuel supplying means for the furnace, means responsive to space temperatures for controlling said fuel supplying means, means responsive to furnace temperatures for controlling also said fuel supplying means, and means responsive to the condition of the heating fluid for rendering both of said temperature responsive means inoperative when the condition of the heating fluid becomes abnormal.

11. In a temperature control system for a furnace for supplying heating fluid to a space for heating the same, the combination of fuel supplying means for the furnace, means responsive to space temperatures for controlling said fuel supplying means, means responsive to furnace temperatures for controlling also said fuel supplying means, means responsive to the condition of the heating fluid for rendering both of said temperature responsive means inoperative when the condition of the heating fluid becomes abnormal, and means responsive to furnace temperatures for rendering both of said temperature responsive means inoperative when the furnace temperature becomes abnormally high or abnormally low.

12. In a temperature control system having a furnace for heating a space, the combination of means for supplying fuel to the furnace, means responsive to the temperature of the space and of the furnace for controlling said fuel supplying means, means responsive to furnace temperatures for controlling said fuel supplying means independently of said first temperature responsive means, and means responsive to furnace temperatures for preventing operation of said fuel supplying means when the fire becomes substantially extinguished.

13. In a temperature control system for a space having a furnace, the combination of, means for supplying fuel to the furnace, switching mechanism for said means, a thermostat responsive to furnace temperatures, adjustable connecting means between said thermostat and said switching mechanism, a space thermostat, slow acting, reversible motor means controlled by said space thermostat, and means operated by said motor means for adjusting said adjustable connecting means whereby said furnace in operated at a temperature which maintains a constant space temperature.

14. In a temperature control system for a space having a furnace, the combination of means for supplying fuel to the furnace, switching mechanism for said control means, means responsive to the condition of the furnace, adjustable connecting means between said condition responsive means and said switching mechanism, a space thermostat, and means controlled by said space thermostat for adjusting said adjustable connecting means.

15. In a control system of the class described, the combination of condition changing means, control means for said condition changing means, means responsive to the condition of said condition changing means, adjustable means between said condition responsive means and said control means, means responsive to the condition controlled by said condition changing means, and slow acting means operated by said last mentioned condition responsive means for adjusting said adjustable means.

16. In a control system of the class described, the combination of condition changing means, control means for said condition changing means, means responsive to the condition of said condition changing means, adjustable means between said condition responsive means and said control means, means responsive to the condition controlled by said condition changing means for mechanically adjusting said adjustable means.

17. In a temperature control system, the combination of heating means for a space, means responsive to the condition of the heating means for maintaining the condition thereof at a value which will maintain the space temperature at a normal value, and means responsive to the space temperature for mechanically adjusting the condition responsive means when the space temperature varies from normal to adjust the condition of the heating means to return the space temperature to normal, said condition responsive means responding to the adjusted condition of the heating means to maintain the condition of the heating means at the adjusted value whereby the space temperature is maintained at normal.

18. In a heating system having a solid fuel fired heating device for heating a space, the combination with means for supplying fuel to said device, of means responsive to the temperature of said space for controlling said fuel supplying means, means to operate said fuel supplying means sufficiently to maintain the fire alive during periods of low heat requirements of said space, and means responsive to the temperature of said fire for preventing operation of said fuel supplying means if the temperature of the fire either reaches a low point indicating extinguishment of the fire or reaches a high point indicating that the fire is too hot.

MERRILL G. BENJAMIN.